United States Patent
Revel

[11] Patent Number: 5,836,102
[45] Date of Patent: Nov. 17, 1998

[54] REMOTE CONTROLLED FISHING AID WITH SIGNALLING CAPABILITY

[76] Inventor: Chase Revel, 2533 N. Carson St., #1647, Carson City, Nev. 89706

[21] Appl. No.: 691,827

[22] Filed: Aug. 5, 1996

[51] Int. Cl.⁶ .......................... A01K 97/12; A01M 31/06
[52] U.S. Cl. ...................................... 43/17; 43/3; 43/26.1
[58] Field of Search ................... 43/3, 17, 26.1, 43/26.2

[56] References Cited

U.S. PATENT DOCUMENTS

| | | | |
|---|---|---|---|
| 885,627 | 4/1908 | Loehr | 43/17 |
| 2,591,554 | 4/1952 | Kinney et al. | |
| 2,693,047 | 11/1954 | Lumsden | 43/26.1 |
| 2,783,574 | 3/1957 | Bayes | 43/16 |
| 2,803,914 | 8/1957 | Ellis | 43/26.1 |
| 3,106,796 | 10/1963 | Friedland | 43/26.1 |
| 3,200,530 | 8/1965 | Dworski | 43/16 |
| 3,646,697 | 3/1972 | Jennings | 43/17 |
| 3,707,801 | 1/1973 | Gednalske | 43/17 |
| 3,882,629 | 5/1975 | Kaye | 43/17 |
| 3,911,609 | 10/1975 | Baya | 43/26.1 |
| 3,959,911 | 6/1976 | Puckett | 43/17 |
| 4,021,957 | 5/1977 | Gleason | 43/16 |
| 4,213,264 | 7/1980 | Robinson, Jr. | 43/16 |
| 4,398,185 | 8/1983 | Roberts, Sr. | 43/17 X |
| 4,520,586 | 6/1985 | Moisan | 43/17 |
| 4,528,554 | 7/1985 | Klefbeck | 43/17 X |
| 4,627,186 | 12/1986 | Wang | 43/16 |
| 4,698,933 | 10/1987 | Shaw | 43/43.12 |
| 4,763,437 | 8/1988 | Cuda | 43/43.13 |
| 5,005,310 | 4/1991 | Rinehart | 43/17 |
| 5,154,016 | 10/1992 | Fedora et al. | 43/26.1 |
| 5,165,193 | 11/1992 | Dankwardt | 43/26.1 |
| 5,309,664 | 5/1994 | Wright | 43/26.1 |
| 5,377,439 | 1/1995 | Roos et al. | 43/3 |

*Primary Examiner*—Robert P. Swiatek
*Attorney, Agent, or Firm*—Henry M. Bissell

[57] ABSTRACT

A remote controlled fishing line transport apparatus for carrying a fishing line and tackle over a body of water to a selected spot. The fishing line is releasably mounted on a boom extending from the transport apparatus. The boom is equipped with a signalling flag to indicate that the line has been pulled by a fish. Various arrangements of flag triggering devices are disclosed.

22 Claims, 11 Drawing Sheets

REMOTE CONTROLLED FISHING AID WITH SIGNALLING CAPABILITY

BACKGROUND OF THE INVENTION

1. Field of the Invention.

The present invention relates to apparatus for assisting fishermen in the practice of their sport and, more particularly, to a device which is self-propelled and remotely controlled for transporting a fishing line and lure to a region not easily reached by casting and which also provides a signal when the lure is taken by a fish.

2. Description of the Related Art.

Devices are well-known in the prior art for carrying a fishing line with tackle attached away from shore or a boat where the fisherman is located into an area that cannot be readily reached by casting. Certain ones of these devices are self-propelled, some being automatically guided and controlled; others being directed by a line from shore. Patents in this category include U.S. Pat. No. 2,693,047 of Lumsden, U.S. Pat. No. 2,803,914 of Ellis, U.S. Pat. No. 3,106,796 of Friedland and U.S. Pat. No. 3,911,609 of Pena Baya.

Other self-propelled devices of this type are remotely controlled by radio transmission. Examples of this prior art are found in U.S. Pat. No. 5,154,016 of Fedora et al, U.S. Pat. No. 5,165,193 of Dankwardt and U.S. Pat. No. 5,309,664 of Wright.

Various fishing aid devices are known which contain some arrangement for alerting the fisherman when a fish has taken the hook and is on the line. Different types of signalling arrangements are known, including spring-loaded masts, electrically powered audible or visible signalling and other types of indications to alert the fisherman. Some of these signalling arrangements are coupled with apparatus for propelling and locating the fishing platform, automatically casting the fishing tackle, automatically setting the hook when a fish bites, etc. corresponding disclosures are found in the following listed patents: U.S. Pat. No. 2,783,574 of Bayes, U.S. Pat. No. 3,200,530 of Dworski, U.S. Pat. No. 3,646,697 of Jennings, U.S. Pat. No. 3,707,801 of Gednalske, U.S. Pat. No. 3,882,629 of Kaye, U.S. Pat. No. 3,959,911 of Puckett, U.S. Pat. No. 4,021,957 of Gleason, U.S. Pat. No. 4,213,264 of Robinson, Jr., U.S. Pat. No. 4,398,185 of Roberts, Sr., U.S. Pat. No. 4,520,586 of Moisan, U.S. Pat. No. 4,528,554 of Klefbeck, U.S. Pat. No. 4,627,186 of Wang, U.S. Pat. No. 4,763,437 of Cuda, and U.S. Pat. No. 5,005,310 of Rinehart.

Each of the known prior art patents possesses some disadvantage or deficiency which is not cured by combination with the other references. None of them, taken alone or in combination, achieves the beneficial results of the present invention in terms of effectiveness, efficiency, cost and performance.

It is an object of the present invention to provide a self-propelled, remote controlled fishing aid of the type described in a structural format which is natural to the habitat where the device is to be used.

It is a further object of the present invention to provide such a device having a line transport and signalling combination which is a natural extension of the self-propelled vessel.

It is also an object of the present invention to provide a signalling arrangement which is not dependent upon electrical or other power sources for its operation.

SUMMARY OF THE INVENTION

In brief, arrangements in accordance with the present invention, which is marketed under the trademark Roboduc, comprise a vessel or hull in the form and shape of a conventional water fowl decoy, preferably a duck. A duck decoy is ideally suited for the purpose of the present invention because it is buoyant, readily available, relatively cheap, rugged, waterproof and its shape and appearance resemble waterfowl which are indigenous in many habitats in which it is used. Furthermore, its physical configuration lends itself readily to the unobtrusive installation of the structure which is utilized for the line handling and signalling combination.

In the preferred arrangement of the present invention, the duck decoy is equipped with a steering mechanism and propulsion system such as are used in radio controlled model boats. Because it is hollow, the duck decoy shell readily accommodates the installation of the radio receiver and the propulsion control system in the space within the hollow shell. Since the decoy is plastic and thus transparent to radio transmissions the antenna for the radio receiver can be mounted inside the shell without the necessity for protruding externally.

The arrangements for handling the fishing line and for signalling to alert the fisherman are mounted on a boom installed as an extension just underneath the duck's tail. This enables the line, both the portion extending downward to the hook and/or lure and the portion leading from the rod and reel at the fisherman's location to be trailed behind the duck as it is propelled over the surface, thus keeping it free from entanglement with the propeller and rudder. A further feature protecting against entanglement with the rudder is a perforated cone-shaped shield which encloses the space from the rudder forward to the penetration of the propeller shaft through the bottom of the duck. This not only aids in keeping the line clear of the rudder but also tends to protect the rudder from becoming entangled in any weeds and other debris in the water.

A spring clip for releasably supporting the hook/lure and terminal portion of the fishing line is mounted on the outer end of the support boom. A fishing line release clip of the type described is the subject of the Shaw U.S. Pat. No. 4,698,933.

Inboard of the line release clip, approximately midway of the boom, is a pivoted mast. A "flag" in the form of a thin plastic or metal blank is affixed to one end of the mast while the other end is weighted so that the mast will pivot to raise the flag when free to do so. The mast with flag attached is "cocked" in a position generally aligned along the boom, being held in that position by a trigger mechanism. The trigger element is a pivotable hook-shaped member held in a cocked position by a frictional retention element. The friction by which the trigger is retained in the cocked position is adjustable by tightening or loosing an adjustment screw.

In setting up the hook and line along the support boom in preparation for using the apparatus of the invention, the mast and trigger are cocked with the trigger member aligned transversely of the boom. One end of the trigger member extends underneath the weighted end of the mast and the hook-shaped end projects outwardly to the other side of the boom to receive a loop of the fishing line after it has been mounted in the line release clip. When the trigger is released, as by a tug on the line to overcome the retention friction and rotate the trigger out of engagement with the mast, the weighted end of the mast moves downward in the water and the flag is raised to signal that the line has been pulled free from the boom.

Another particular arrangement in accordance with the present invention provides a retractable pin to support the weight of the weighted end of the mast. This pin is spring-loaded to retract from the extended position next to the mast when the pin is released and permitted to do so by the trigger member being rotated to uncover the other end of the pin on the opposite side of the boom from the mast and flag. When the pin is released, the weighted end of the mast is freed to be lowered, thereby pivoting the mast about its central pivot axis and raising the signalling flag as previously described.

Still another arrangement in accordance with the present invention includes a coiled spring which is stretched from its anchor position when the mast is pivoted to the cocked position, held by the trigger. Releasing the trigger permits the stretched spring to compress, thereby pivoting the mast to an upright position and raising the signalling flag to alert the fisherman.

In still another arrangement in accordance with the present invention, the mast is mounted to the boom by means of a hinge, rather than a pivoted arrangement. A tensioned spring provides the force to raise the mast and signalling flag when it is released from the trigger mechanism. In this embodiment, the trigger member is modified to hook over a pin attached to the mast. Pulling the line which is looped over one end of the trigger member causes it to pivot out of the hooked position, thereby releasing the mast to be raised by the tension spring.

The Roboduc allows the fisherman to take the bait practically anywhere on the water, and keep the bait constantly in places where he suspects fish are feeding. Fish are not spooked by the Roboduc because they are accustomed to ducks being in the vicinity. Under ordinary circumstances, a fisherman casting to choice spots spends 90% of his time reeling the bait back in so he can cast again. The theory is that the more fish you can present your bait to, the more fish you will catch. Therefore the Roboduc is ten times more effective than casting, in addition to avoiding most instances of lost tackle which often becomes caught on tree limbs, roots, rocks and unknown underwater debris which snag the line during casting or dragging the bait back and requires that the bait and attached line must be cut or broken because it cannot be pulled free.

The preferred embodiment of the invention includes a line and bait control mechanism which is anchored inside the duck and extends 18 inches behind. On the end of the control mechanism is a spring-loaded rubber-jawed clip which holds the fishing line coming from the fisherman's rod and reel. The tension of the clip is somewhat adjustable to allow it to release more easily if one is fishing for small fish.

A fisherman can allow any length of line to the bait on the end trail behind the Roboduc, but if the fish that takes the bait does not put much tension on the line, the fisherman will not know he has a strike. Therefore, the line goes from the line clip to a hook or trigger element called the "flag release hook". The tension on this hook can be adjusted to the lightest biting fish. The line is wrapped around the hook once and the line then extends to the bait. When a fish puts tension on the line, the hook is pulled toward the bait which releases the flag, thereby notifying the fisherman that he has a bite.

As the fisherman jerks the line to set the hook the line is released from the line clip, setting the Roboduc free so the fish can be reeled in directly to the fisherman.

If the line gets caught on something in the water, usually the fisherman can free it easily because he is frequently at a different angle than the Roboduc and bait were travelling. He simply jerks the line free from the line clip and reels it in another direction away from the snag, freeing the bait. Or he can turn the Roboduc around and move it in the opposite direction of the snag.

BRIEF DESCRIPTION OF THE DRAWING

A better understanding of the present invention may be realized from a consideration of the following detailed description, taken in conjunction with the accompanying drawing in which.

DETAILED DESCRIPTION OF THE PREFERRED EMBODIMENTS

Figure 1:
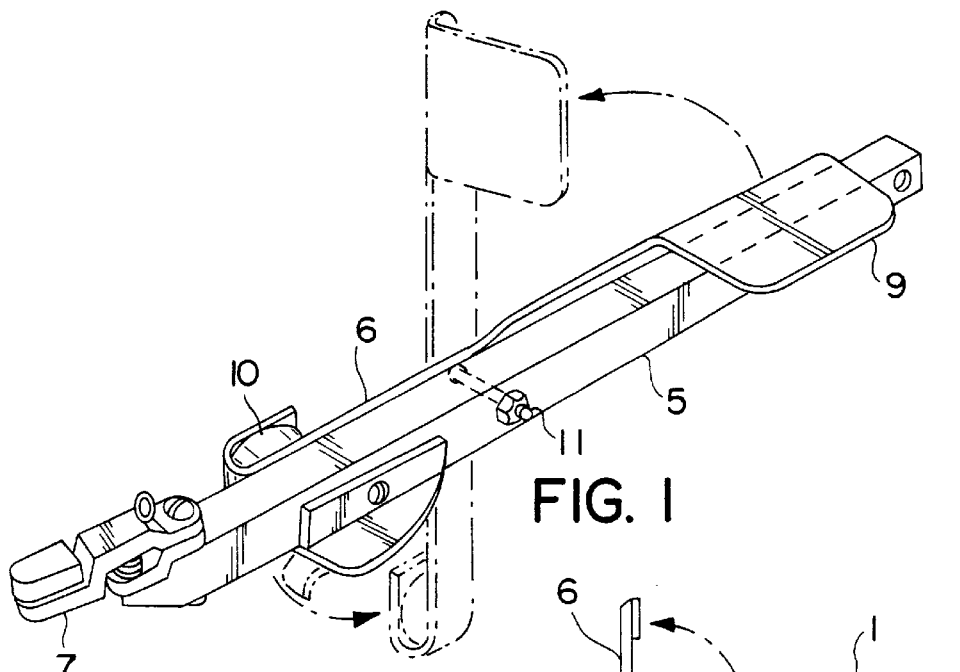
FIG. 1 is a perspective view in partial phantom, showing details of a particular portion of the invention.
Figure 2:
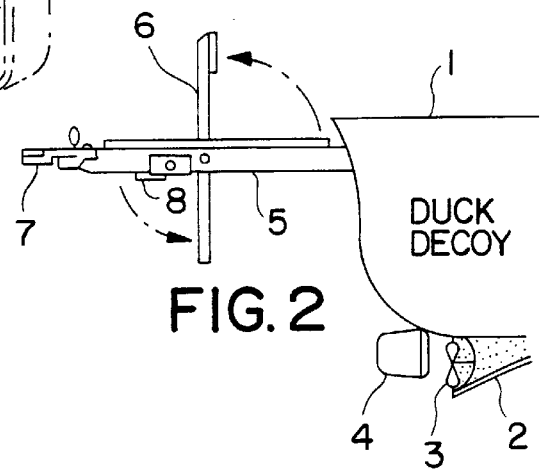
FIG. 2 is a schematic diagram showing the portion of FIG. 1 in combination with the propulsion device mounted in the duck decoy of the invention.
Figure 15:
FIG. 15 is a schematic view showing the remote control of the device of the invention.

FIG. 2 shows a duck decoy 1 adapted for movement in the water. A motor (not shown) drives propeller 3 to provide thrust for the decoy. The propeller is positioned within a shielding housing 2, comprised of a conical screen having perforations permitting unobstructed flow of water, but preventing entangling weeds and debris from interfering with the rotation of the propeller. A rudder 4 is provided to effect steering of the decoy in a conventional manner. Motor and rudder control are effected through remote control, with a receiver installed within the duck decoy for receiving signals from a transmitter at a remote location, such as on shore or a boat (FIG. 15), and converting these signals to electrical control signals for activating servos on the duck decoy in a conventional manner.

To the stern of the decoy 1 is anchored a substantially horizontal extension in the form of a boom 5 supporting a fishing line retaining clip 7 and a mast 6. The retaining clip releasably holds fishing line 32, which extends from the fisherman, to the retaining clip 7, then to trigger 8 around which it is looped. From the trigger 8, fishing line 32 descends into the water to hold the fishing gear, such as a sinker and a baited hook or lure.

Figure 3:
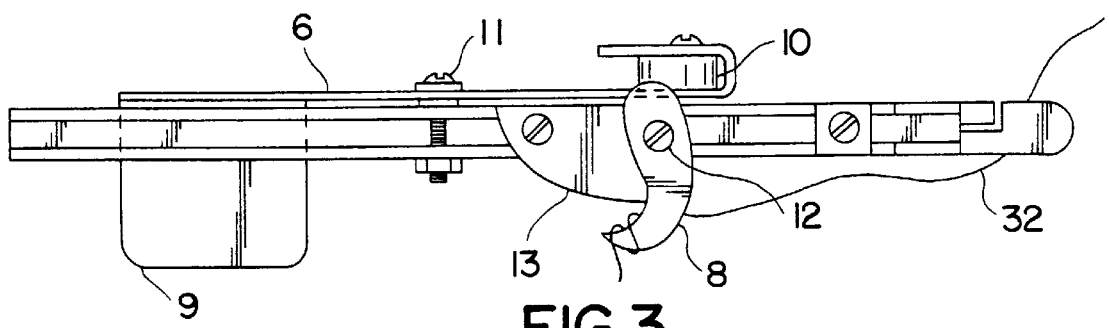
FIG. 3 is a view from the underside of the arrangement of FIG. 1.
Figure 4:
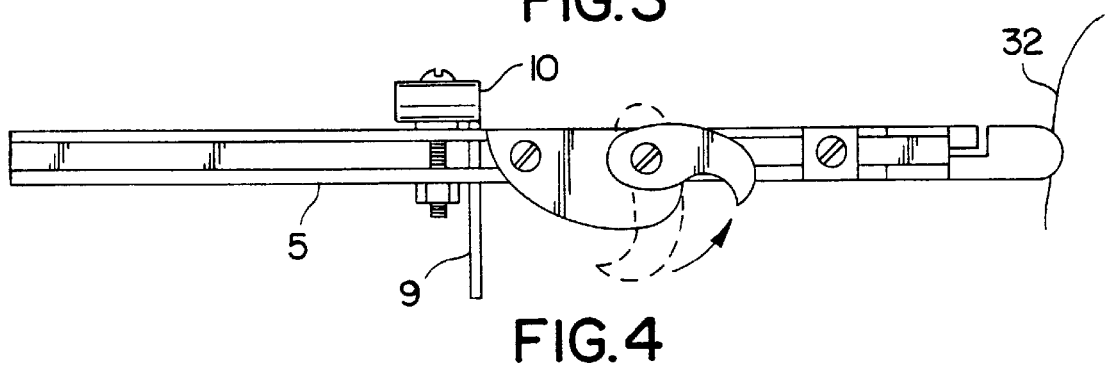
FIG. 4 is a partial phantom view of the arrangement shown in FIG. 3.

In operation, mast 6 is retained in a horizontal cocked position, shown in FIG. 3, by trigger 8. Mast 6 is weighted by counterweight 10, and is pivoted to rotate about a pivot point, shown as a bolt 11. When a fish pulls on fishing line 32, the line causes trigger 8 to swivel from a retaining position to a non-retaining position shown in FIG. 4, thereby allowing weighted mast 6 to swing downward under the weight of the counterweight 10 and assume a vertical signalling position. Flag 9, affixed to the end opposite the counterweight 10 on mast 6, is thus raised, signalling the presence of a fish. Trigger 8 is appropriately shaped and can be either curved or it can be provided with a detent for accommodating fishing line 32.

Figure 5A:
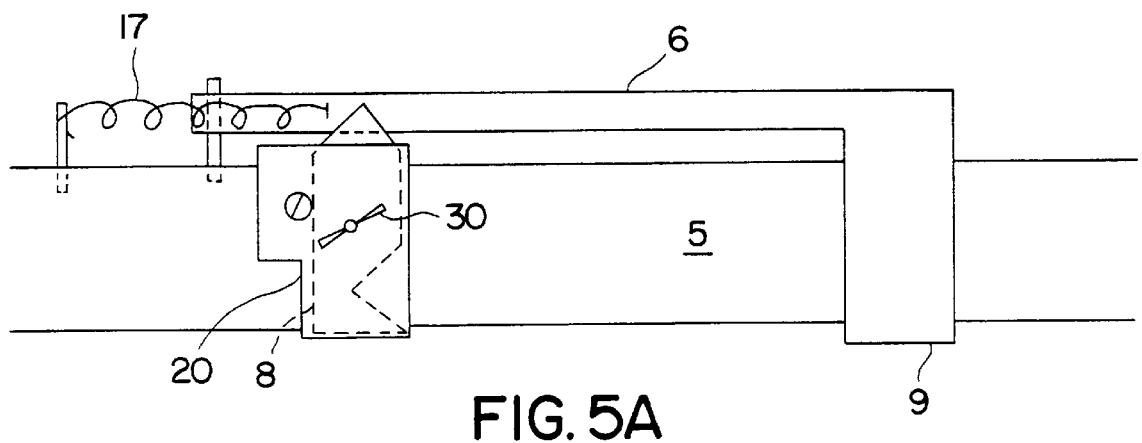
FIGS. 5A and 5B are, respectively, a top view and a side view of a spring biased embodiment of the invention.
Figure 5B:
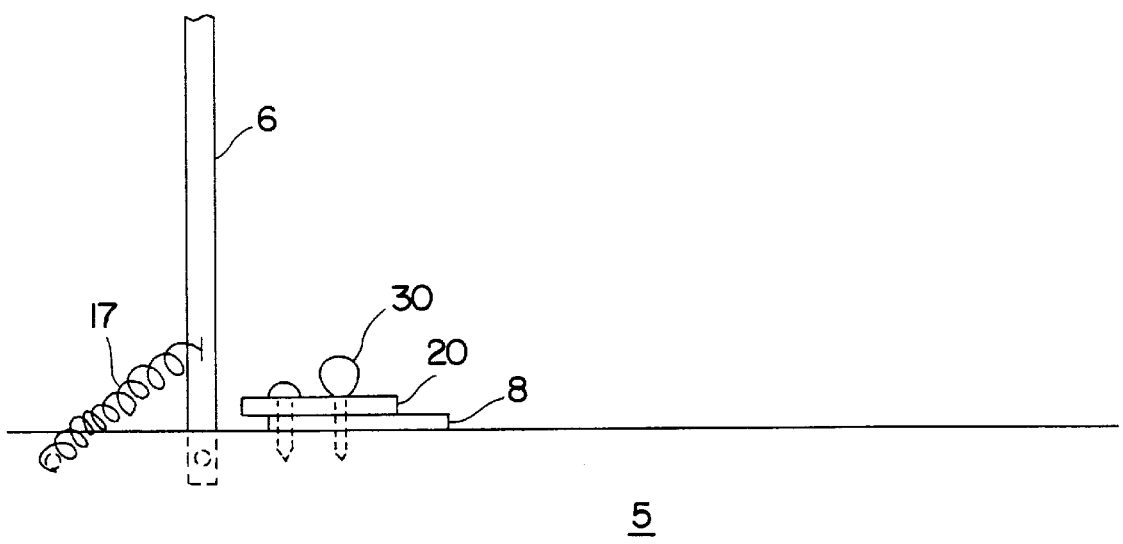

Alternatively, mast 6 can be spring biased towards the signalling position, with the stored energy in a spring 17 being released when the trigger 8 is moved to the non-retaining position by force on fishing line 32. This is illustrated in FIGS. 5A and 5B.

Figure 6A:
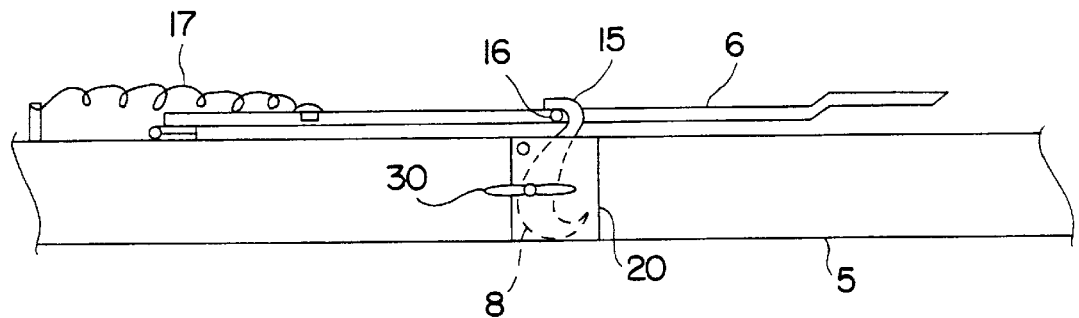
FIGS. 6A and 6B are, respectively, a top view and a side view of an arrangement in which the trigger and the mast rotate in parallel planes.
Figure 6B:
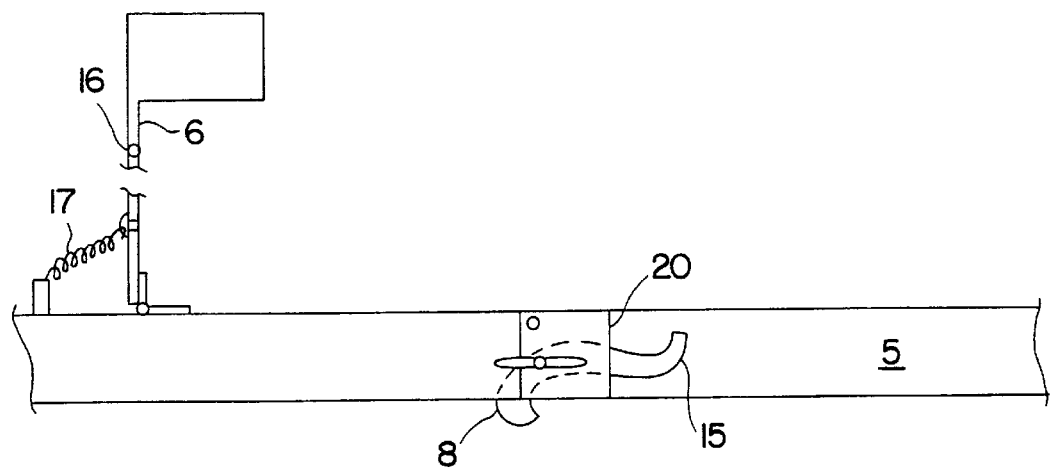

As shown in FIGS. 6A and 6B, trigger 8 can be provided to swivel in the same plane as mast 6, in which case it is provided with a hooked end 15 which engages a pin 16 disposed on mast 6 when mast 6 is in the cocked position.

Trigger 8 is disposed within a housing 20. An adjustable screw 30, such as a thumb screw, holds trigger 8 against the mast in the housing, and can be turned to adjust the friction on trigger 8 and the resistance encountered as it swivels in response to sufficient tension on the line.

Figure 7A:
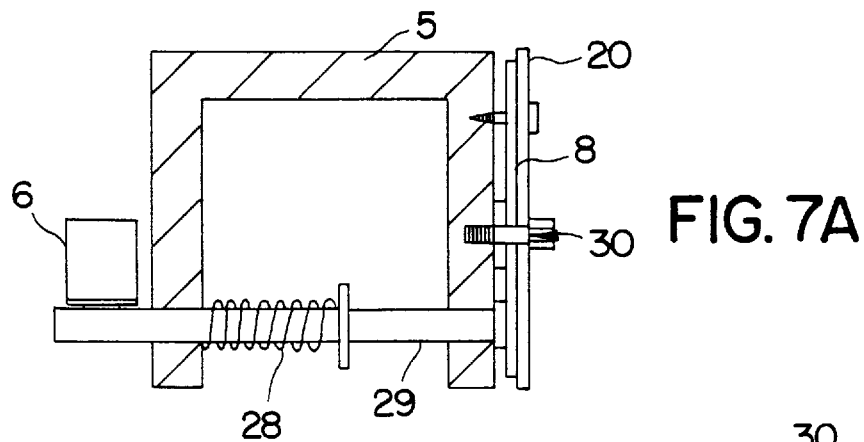
FIGS. 7A and 7B are, respectively, a cross-sectional view and a side view of an alternative mast triggering arrangement, with the mast in the cocked position.
Figure 7B:
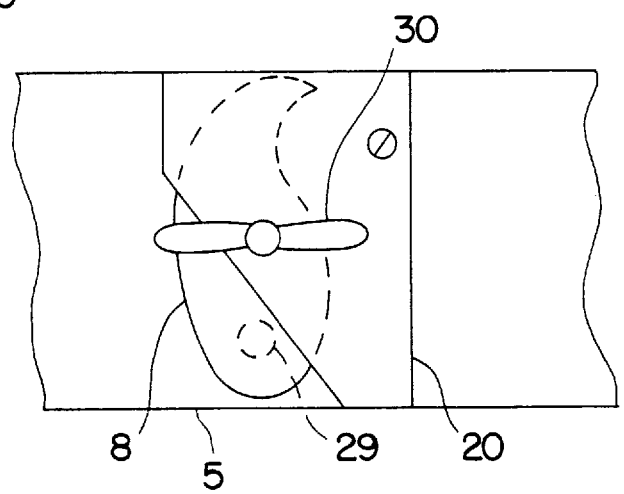
Figure 8A:
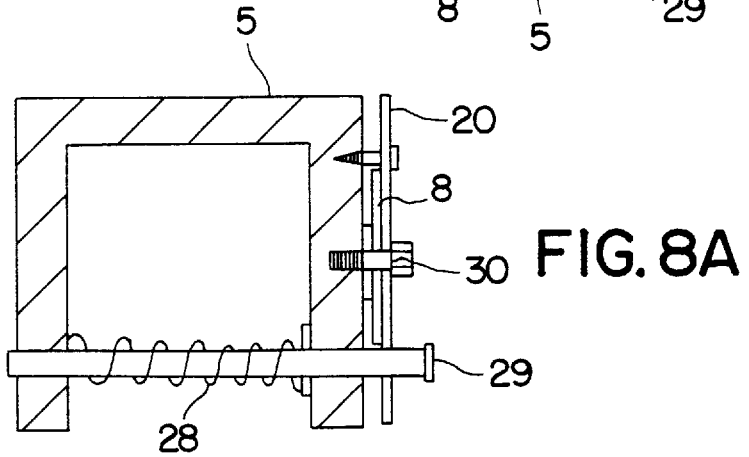
FIGS. 8A and 8B show the arrangement of FIGS. 7A and 7B, with the mast released to the signalling position.
Figure 8B:
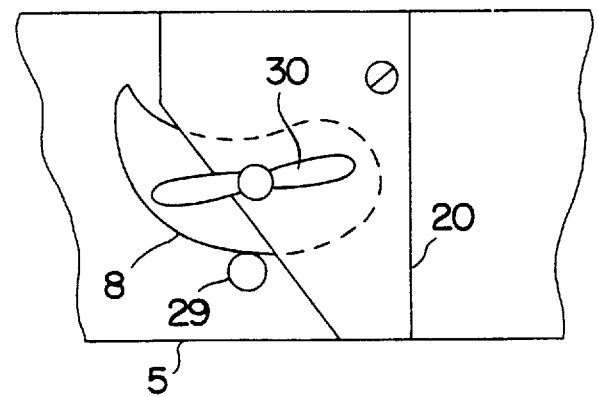

To retain mast 6 in the cocked position, trigger 8 can be adapted to restrict the motion of a release pin 29, which in turn prevents mast 6 from rotating to the signalling position, as shown in FIGS. 7A and 7B. The swivelling motion of trigger 8, due to action by a fish, then releases pin 29, which is urged out of the path of mast 6 by spring 28. This permits unobstructed movement of mast 6 to the signalling position as illustrated in FIGS. 8A and 8B. Boom 5 is shown to be U-shaped in cross section to better accommodate spring 28 and to provide for lighter and cheaper construction.

Figure 14A:
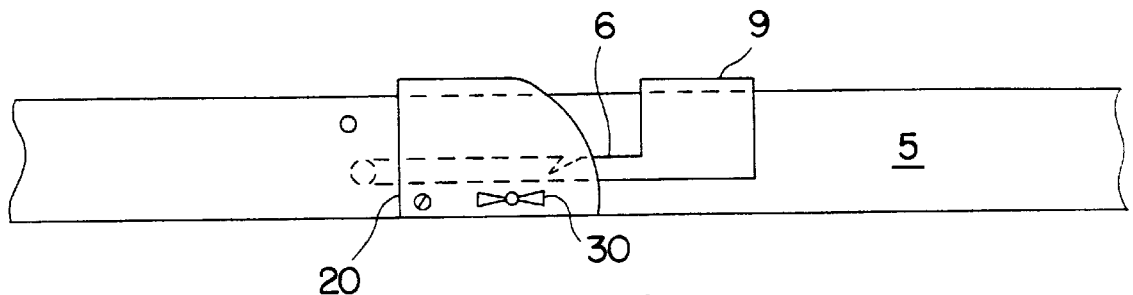
FIGS. 14A–14C are, respectively, a side view with the mast in the cocked position, a top view with the mast in the cocked position, and a side view with the mast in the signalling position for still another arrangement of the invention.
Figure 14B:
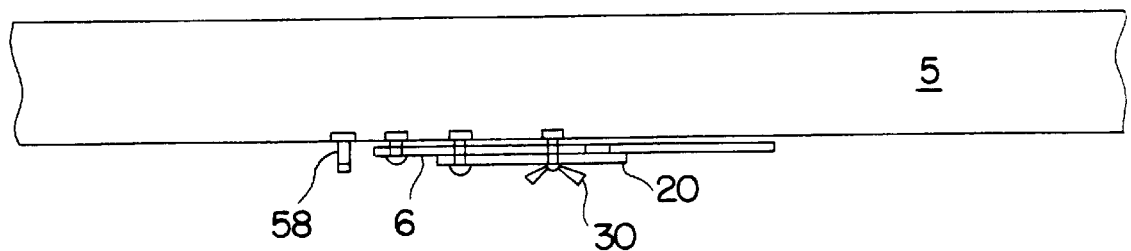
Figure 14C:
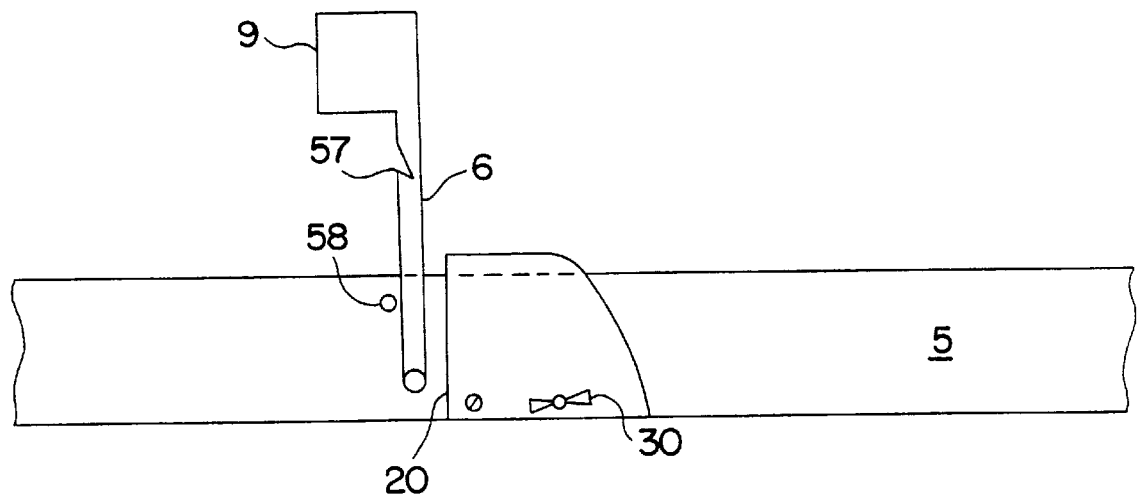

Mast 6 may be moved to the signalling position directly by the force exerted on fishing line 32. In FIGS. 14A, 14B and 14C, a notch 57 is provided on mast 6 for retaining fishing line 32 therein. Tension on the fishing line pulls mast 6 from the cocked position (FIG. 14A) to the signalling position (FIG. 14C). A stop pin 58 is provided to restrict further rotation of mast 6. Control of the tension on mast 6 is effected through adjustable screw 30, which controls the force that housing 20 exerts on mast 6.

Figure 9A:
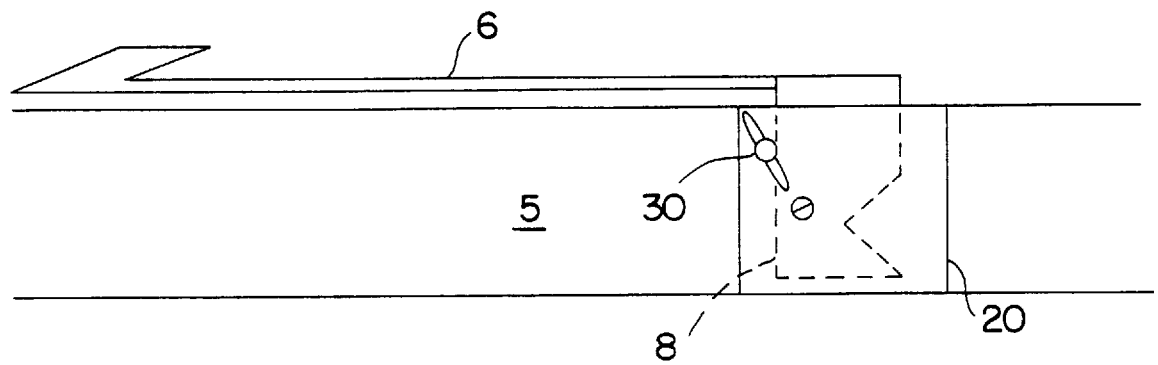
FIGS. 9A and 9B are side views of an arrangement in which the trigger is rigidly attached to the mast.
Figure 9B:
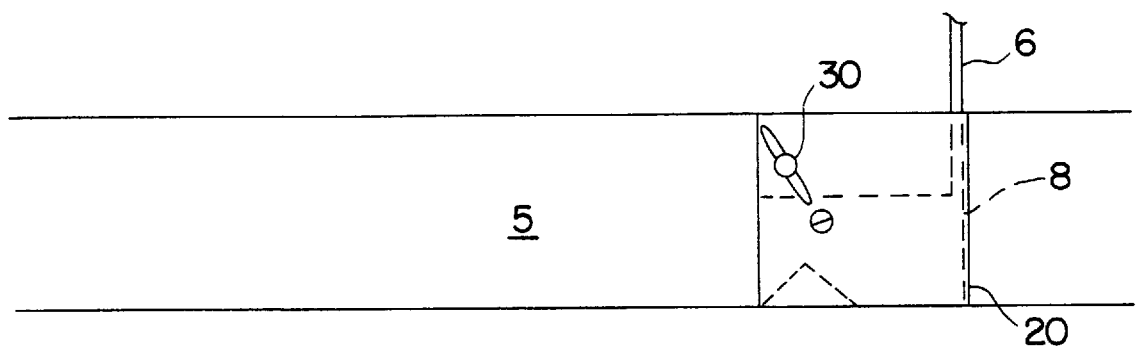

Alternatively, as shown in FIGS. 9A and 9B, mast 6 may be rigidly connected to trigger 8. Swiveling of trigger 8 in response to tension on fishing line 32 pulls mast 6 from the cocked position of FIG. 9A to the signalling position of FIG. 9B.

Figure 10A:
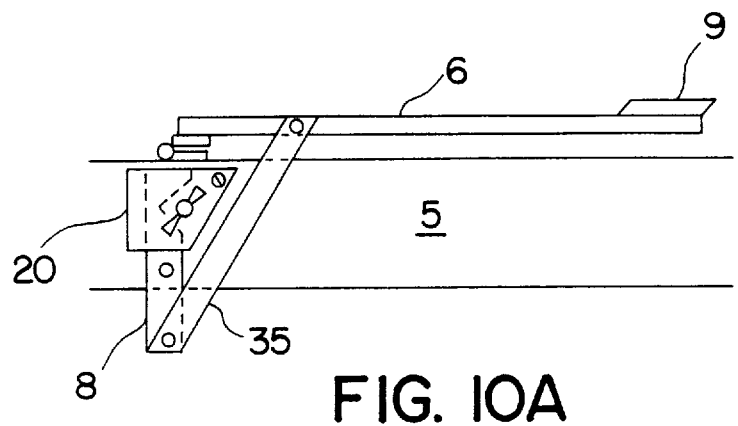
FIGS. 10A and 10B are side views of an arrangement in which the mast is mechanically linked to the trigger.
Figure 10B:
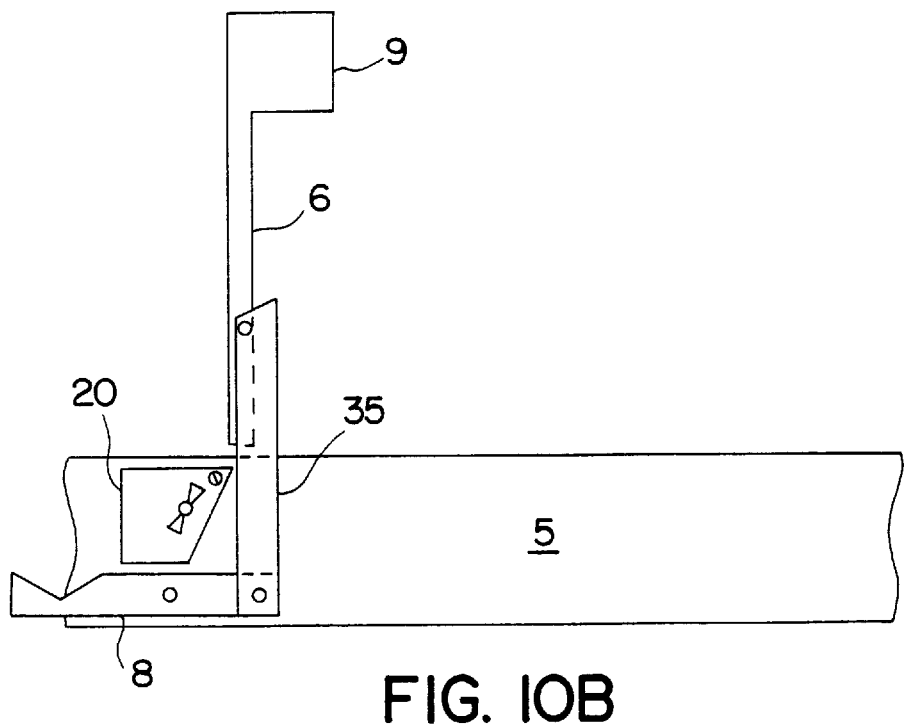

As shown in FIGS. 10A and 10B, movement of mast 6 can be effected through a mechanical linkage. Lever 35 is pivotally attached to mast 6 and trigger 8 and provides a mechanical advantage in moving mast 6 from the cocked position to the signalling position.

Figure 11A:
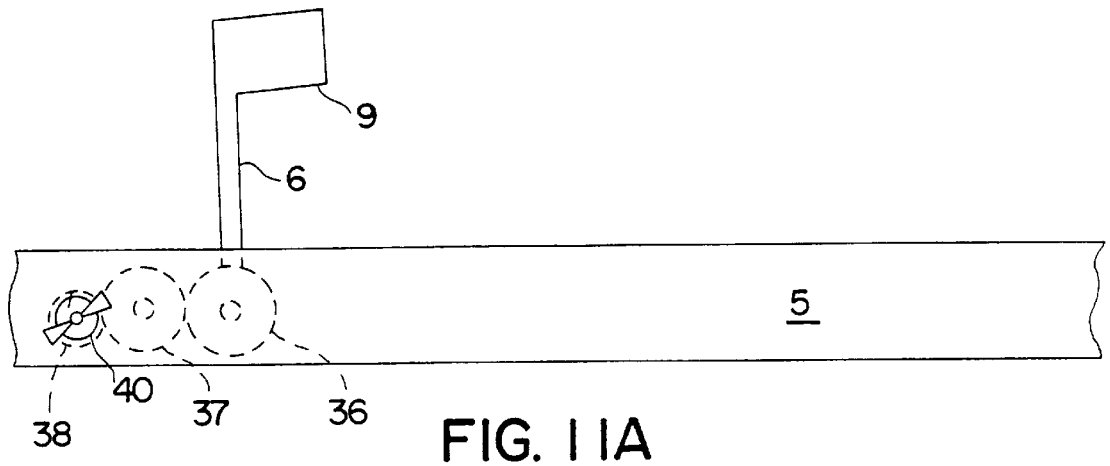
FIGS. 11A–11C depict an arrangement for a gear linkage between mast and trigger.
Figure 11B:
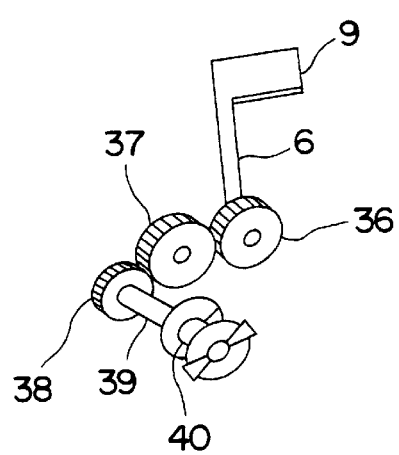
Figure 11C:
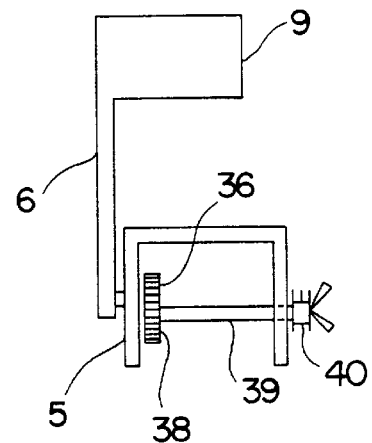

Alternatively, mast 6 can be made to rotate using a gearing system as illustrated in FIGS. 11A–11C. Gear 37 engages gears 36 and 38. Gear 38 rotates with hub 40, to which it is connected by axle 39. Fishing line 32 is releasably wound around hub 40, and when it is pulled, as by a fish, it rotates the gearing system, lifting mast 6 to the signalling position.

Figure 12A:
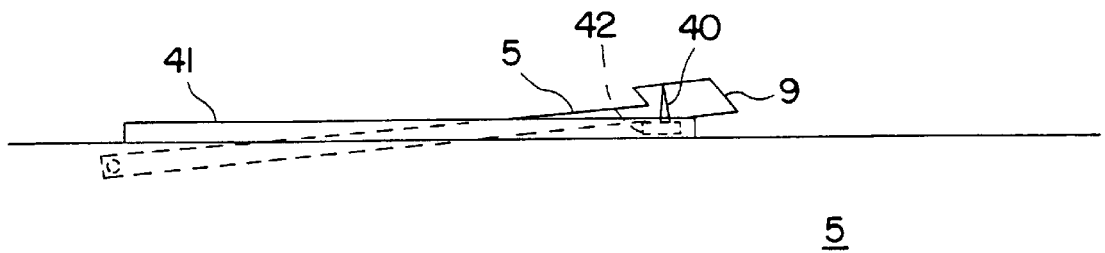
FIGS. 12A–12C are, respectively, a side view with the mast in cocked position, a side view with the mast in the signalling position, and a top view with the mast in the cocked position, for a sliding trigger arrangement.
Figure 12B:
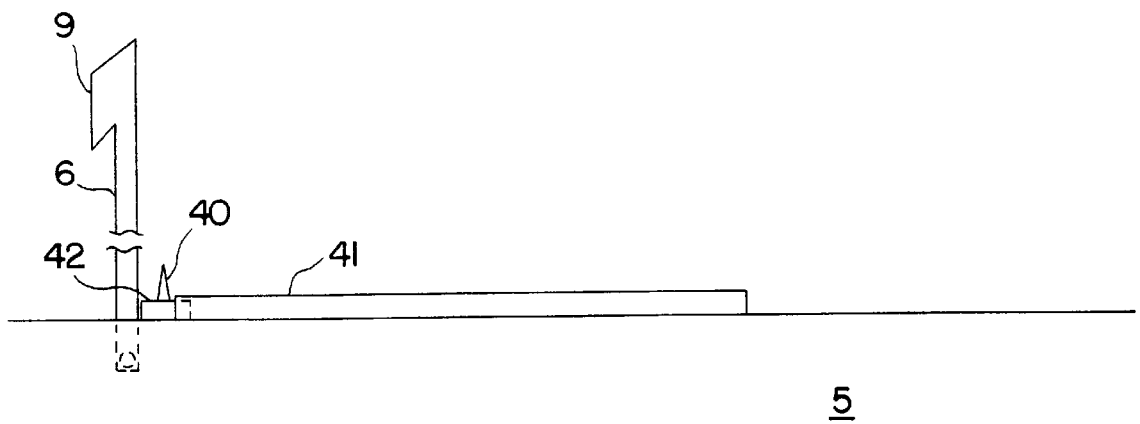
Figure 12C:
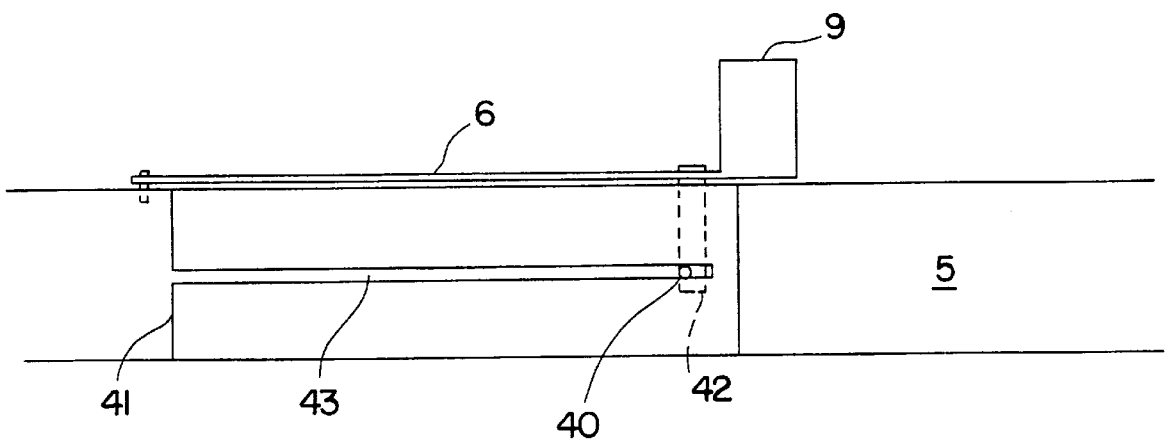

Rather than a swiveling trigger, a sliding trigger may be provided, as illustrated in FIGS. 12A, 12B and 12C. Trigger 42, which carries pin 40 around which fishing line 32 is releasably wound, reciprocates within housing 41 and a segment of trigger 42 protrudes from said housing as best shown in FIG. 12C. Pin 40 travels in slot 43 provided in housing 41. When trigger 42 is in one extreme position (FIG. 12C), mast 6 is in the cocked position, resting on the protruding segment of trigger 42. When the fishing line, which is looped around pin 40, is pulled, trigger 42 slides to the other extreme position (FIG. 12B), lifting mast 6 to the signalling position. Fishing line 32 is then released as pin 40 emerges from slot 43 in housing 41.

Figure 13A:
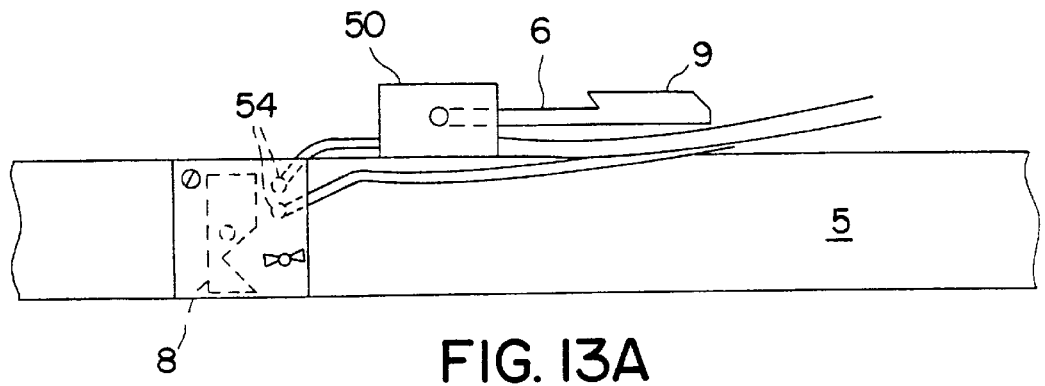
FIGS. 13A–13C are, respectively, a side view with the mast in the cocked position, a top view with the mast in the cocked position, and side view with the mast in the signalling position, for a servo-actuated embodiment of the invention.
Figure 13B:
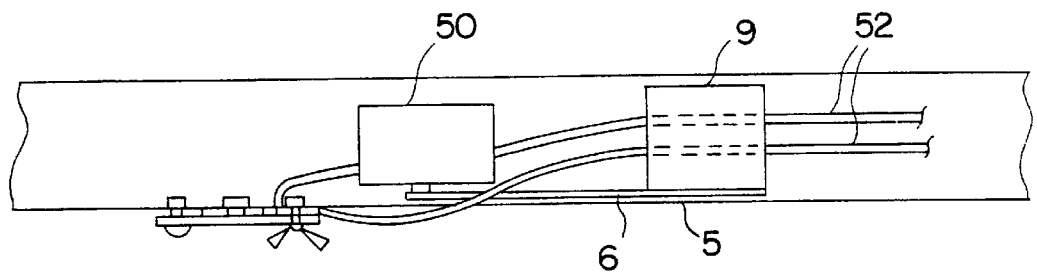
Figure 13C:
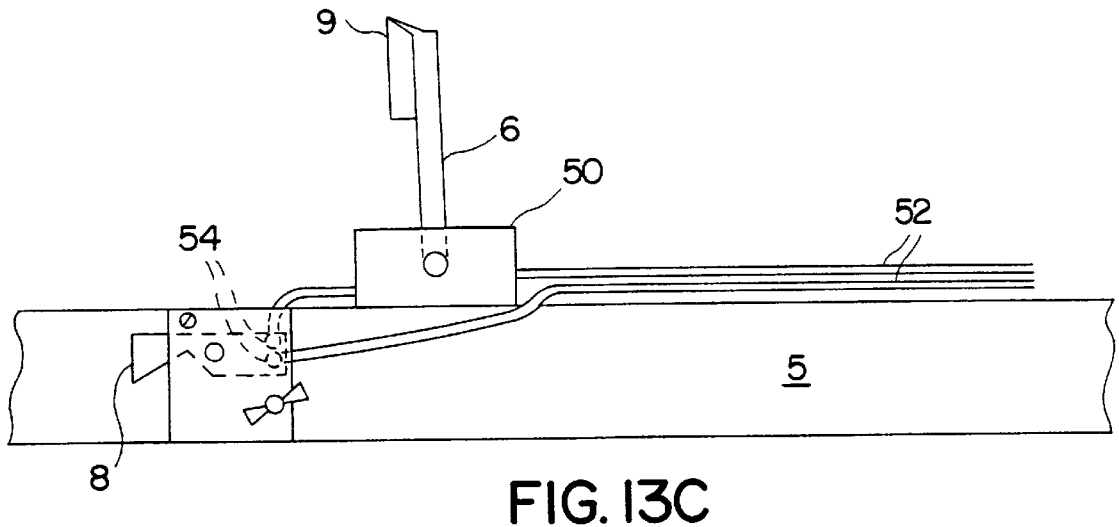

Trigger 8 can also be configured to operate as an electrical switch, as best illustrated in FIGS. 13A, 13B and 13C. Made of a conducting material, trigger 8 closes a circuit when it swivels to the position shown in FIG. 13C, covering contacts 54. Servo motor 50, appropriately powered through leads 52, is then actuated and raises mast 6 to the signalling position.

Figure 16A:
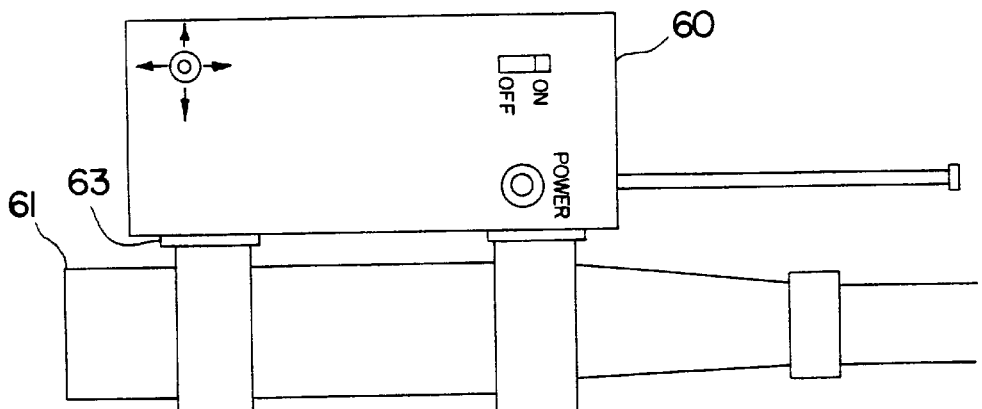
FIGS. 16A and 16B are, respectively, schematic top and side views showing the transmitter clipped to the fishing rod.
Figure 16B:
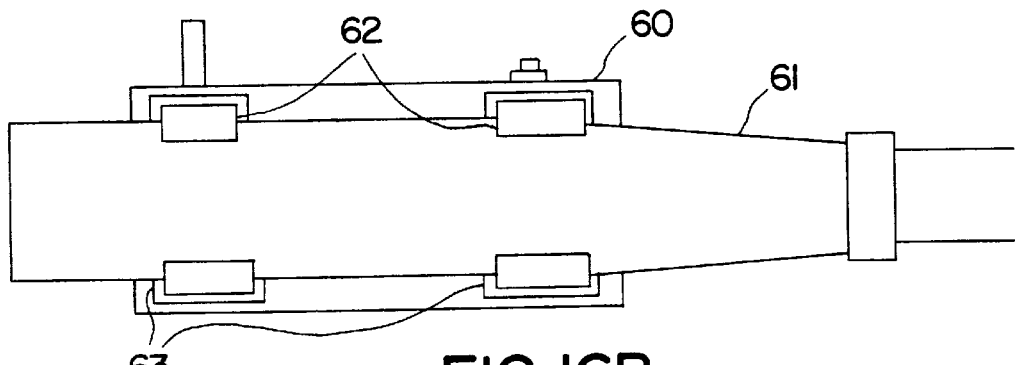

FIGS. 16A and 16B illustrate the remote control unit 60 in conjunction with the handle of a fishing rod 61. Remote control 60 is equipped with clips 62, which are mounted on remote control 60 through mounts 63. Clips 62 are made of a flexible material to firmly but releasably clasp fishing rod handle 61, freeing the fisherman's hand.

Although there have been described hereinabove various specific arrangements of a remote controlled fishing aid with signalling capability in accordance with the invention for the purpose of illustrating the manner in which the invention may be used to advantage, it will be appreciated that the invention is not limited thereto. Accordingly, any and all modifications, variations or equivalent arrangements which may occur to those skilled in the art should be considered to be within the scope of the invention as defined in the annexed claims.

What is claimed is:

1. A fishing line transport device comprising:

a buoyant body;

propulsion means for propelling said buoyant body in water, said propulsion means having a power source and a drive mechanism;

a radio system for remotely controlling the movement of said buoyant body;

fishing line holding means for releasably holding the fishing line;

a boom mounted to extend rearwardly from said buoyant body for supporting said fishing line holding means remotely from said drive mechanism; and a signalling device mounted on said boom and pivotable into an upright position.

2. The fishing line transport device of claim 1 further including a trigger assembly for retaining said signalling device in a position along the boom prior to release of the signalling device upon the fishing line being pulled.

3. The fishing line transport device of claim 2, wherein said signalling device comprises a mast having a flag disposed on one side of a pivot point, said mast being pivotally mounted on said boom at said pivot point, and means for controlling rotation about said pivot point from a cocked position to a signalling position.

4. The fishing line transport device of claim 3, wherein said trigger assembly comprises an actuating means for activating said signalling device, and a trigger arm adapted for displacement in response to force exerted on said trigger arm by said fishing line.

5. The fishing line transport device of claim 4, wherein said actuating means is provided with an adjustment means for adjusting the amount of force required to induce displacement of said trigger arm.

6. The fishing line transport device of claim 5, wherein said mast is provided with a biasing spring for urging said mast to said signalling position.

7. The fishing line transport device of claim 6, wherein said trigger arm is displaced from a retaining position to a non-retaining position, said retaining position inhibiting the movement of said mast from said cocked position to said signalling position, said non-retaining position permitting uninhibited movement of said mast from said cocked position to said signalling position.

8. The fishing line transport device of claim 6, wherein said actuating means is provided with a spring biased pin adapted for axial displacement from a retaining position to a non-retaining position, said retaining position inhibiting the movement of said mast from said cocked position to said signalling position, said non-retaining position permitting uninhibited movement of said mast from said cocked position to said signalling position.

9. The fishing line transport device of claim 5, wherein said adjustment means is a thumb screw.

10. The fishing line transport device of claim 5, wherein said trigger arm is mechanically linked to said mast by a lever member, said lever member pivotally connected to said trigger arm and said mast.

11. The fishing line transport device of claim 5, wherein said mast is provided with a counterweight on a side of said pivot point opposite said flag, said counterweight urging said mast to rotate about said pivot point from said cocked position to said signalling position.

12. The fishing line transport device of claim 11, wherein said actuating means is provided with a spring biased pin adapted for axial displacement from a retaining position to a non-retaining position, said retaining position inhibiting the movement of said mast from said cocked position to said signalling position, said non-retaining position permitting uninhibited movement of said mast from said cocked position to said signalling position.

13. The fishing line transport device of claim 5, wherein said trigger arm is rigidly attached to said mast.

14. The fishing line transport device of claim 5, wherein said trigger arm activates a servo adapted to displace said flag from said cocked position to said signalling position.

15. The fishing line transport device of claim 4, wherein said actuating means is comprised of a slide cover having a slot formed therein, a pin disposed in said slot for reciprocation in said slot, and a slide bar rigidly attached to said pin, said slide bar inducing said mast to rotate upon exertion of force on said pin through said fishing line.

16. The fishing line transport device of claim 3, wherein a retaining plate is provided for releasably holding said mast in said cocked position, and wherein an adjustment device for adjusting pressure exerted on said mast by said retaining plate.

17. The fishing line transport device of claim 3, wherein a first gear is rigidly attached to said mast at said pivot point, said first gear is coupled to a second gear, said second gear rigidly is attached to a hub adapted for rotation in response to tension exerted on said fishing line.

18. The fishing line transport device of claim 1, wherein the buoyant body is in the form of a hollow duck decoy containing a power source;
    an electric motor powered by said power source and coupled to drive a propeller extending, together with a rudder, below the decoy body;
    a radio receiver; and
    signal responsive means for controlling the rudder and the propeller drive motor.

19. The fishing line transport device of claim 1, wherein said drive mechanism is comprised of a propeller adapted for rotation inside a perforated shield having a generally conical shape.

20. The fishing line transport device of claim 1, wherein said propulsion means and said steering means are controlled from a location remote from said buoyant body.

21. The fishing line transport device of claim 20, wherein a transmitter is provided for emitting signals to said steering means and said propulsion means to effect control thereof, said transmitter being adapted for releasable attachment to a fishing pole.

22. The fishing line transport device of claim 21, wherein clips are provided for effecting said releasable attachment.

* * * * *